(12) United States Patent
Siraky

(10) Patent No.: US 8,134,262 B2
(45) Date of Patent: Mar. 13, 2012

(54) KIT SERVOMOTOR

(75) Inventor: Josef Siraky, Donaueschingen (DE)

(73) Assignee: Sick Stegmann GmbH, Donaueschingen (DE)

( * ) Notice: Subject to any disclaimer, the term of this patent is extended or adjusted under 35 U.S.C. 154(b) by 379 days.

(21) Appl. No.: 12/457,509

(22) Filed: Jun. 12, 2009

(65) Prior Publication Data

US 2009/0315433 A1 Dec. 24, 2009

(30) Foreign Application Priority Data

Jun. 19, 2008 (EP) ..................................... 08011128

(51) Int. Cl.
*H02K 11/00* (2006.01)

(52) U.S. Cl. ...................................... 310/68 B

(58) Field of Classification Search .................. 310/68 B
See application file for complete search history.

(56) References Cited

U.S. PATENT DOCUMENTS

| | | | | |
|---|---|---|---|---|
| 5,184,038 | A * | 2/1993 | Matsui et al. ................ | 310/68 B |
| 6,118,201 | A * | 9/2000 | Dulin et al. .................... | 310/161 |
| 7,190,099 | B2 * | 3/2007 | Kawasaki et al. .......... | 310/216.1 |
| 7,336,007 | B2 * | 2/2008 | Chitayat et al. ............ | 310/12.07 |
| 7,683,512 | B2 * | 3/2010 | Gao et al. ..................... | 310/68 B |
| 2001/0043864 | A1 * | 11/2001 | Maruyama et al. .......... | 417/44.1 |
| 2010/0313776 | A1 * | 12/2010 | Ferrari et al. ............... | 101/407.1 |

FOREIGN PATENT DOCUMENTS

| | | |
|---|---|---|
| DE | 197 42 800 C1 | 9/1999 |
| EP | 0 146 783 A2 | 7/1985 |

* cited by examiner

*Primary Examiner* — Dang D Le
(74) *Attorney, Agent, or Firm* — The Nath Law Group; Jerald L. Meyer; Derek Richmond

(57) ABSTRACT

A kit servomotor consists of an electromotor and a rotary encoder. The electromotor has a motor stator (3, 8) and a rotor (1), which is positioned in unsupported fashion in the motor stator. The motor stator (3, 8) and the rotor (1) can be installed on the output end. The rotor (1) is designed as a hollow shaft, at least on its end opposite the end used for installation. The rotary encoder is attached to the electromotor on the end opposite the installation end and has a stator unit (4) and an encoder shaft (5). The stator unit (4) is connected to the motor stator (3, 8). The encoder shaft 5 is connected to the rotor (1) using a coupling that is isogonal with respect to the angle of rotation, but elastic in the radial and axial directions. At its motor end, which is coaxial to the hollow shaft of the rotor (1), the encoder shaft (5) has an outer diameter that is smaller than the inner diameter of the hollow shaft. The coupling is axially flat in design and bridges the annular gap between the outer diameter of the encoder shaft (5) and the inner diameter of the hollow shaft of the rotor (1).

10 Claims, 1 Drawing Sheet

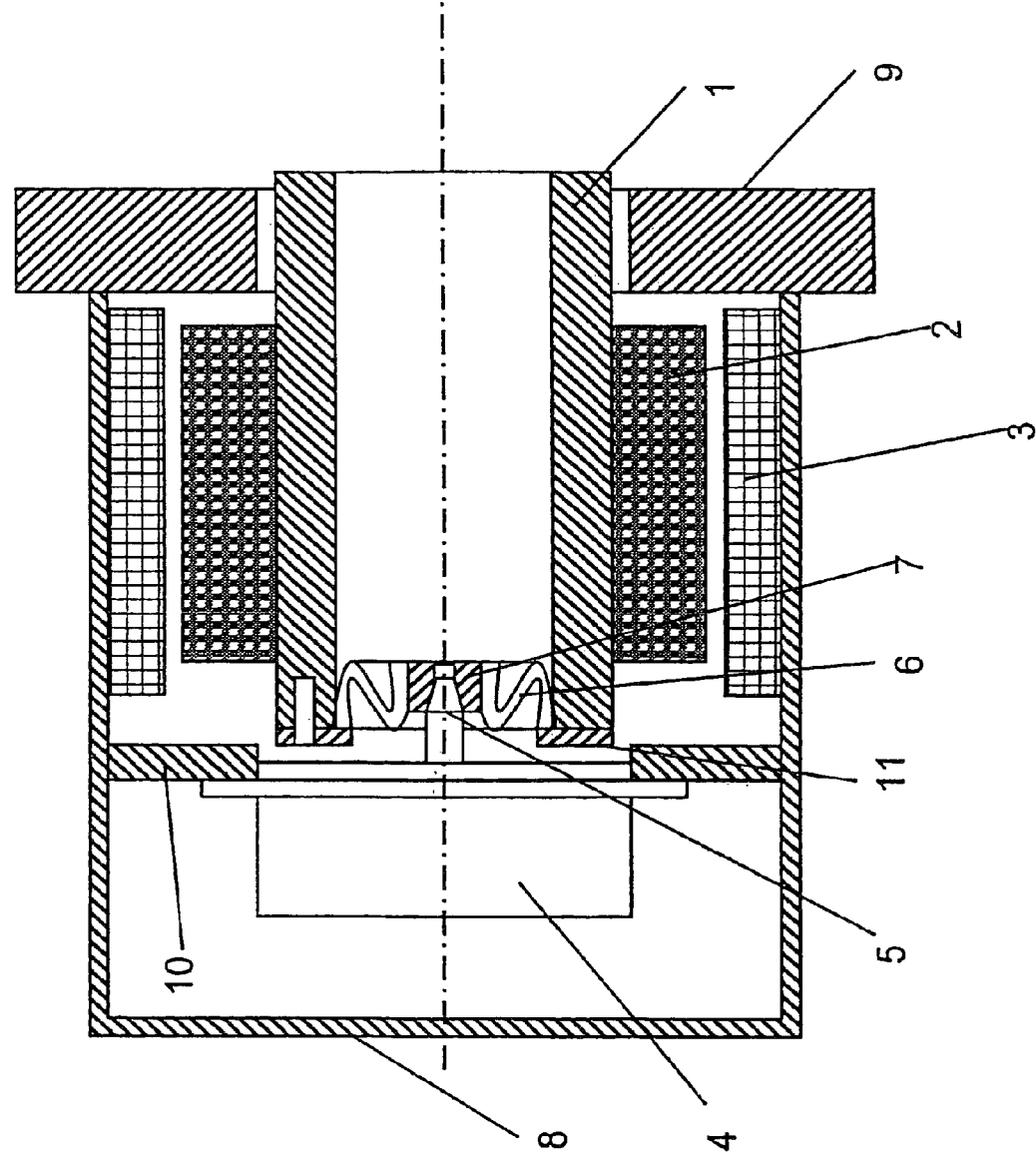

KIT SERVOMOTOR

BACKGROUND OF THE INVENTION

The invention relates to a kit servomotor.

Servomotors consist of an electromotor and a device for measuring angular rotation, which in the following is referred to as a rotary encoder. The electromotor has a motor stator and a rotor, such that the rotary encoder measures the angle of rotation, or a rotor magnitude that is dependent on the angle of rotation, in relation to the motor stator or the motor housing. To this end, an encoder shaft belonging to the rotary encoder is coupled to the rotor of the electromotor, and a stator unit belonging to the rotary encoder is coupled to the motor stator. The coupling must create an isogonal connection that is as true as possible, in order to provide an exact angular measurement. At the same time, it must be able to accept the radial and axial alignment tolerances that are unavoidable with the installation of the rotary encoder on the electromotor.

Two basic variations are known for coupling the rotary encoder to the electromotor. In one design, the motor stator of the electromotor and the stator unit of the rotary encoder are firmly connected to each other, and the rotor of the electromotor and the encoder shaft are connected to each other with a coupling that is radially and axially flexible, but provides as much angular rigidity as possible, particularly a coupling in the form of a bellows connection. In another design, the rotor of the electromotor is firmly connected to the encoder shaft, and the motor stator and the motor stator unit of the rotary encoder are connected to each other over a stator coupling, which is often referred to as a torque support arm. The basic construction of the two designs is described, e.g., in DE33 10 564 A1.

For kit electromotors, the rotor is positioned in the motor stator without being mounted. The kit motor is made available for the given application as a unit consisting of the motor stator and the mounted rotor. Only when the kit motor is installed on the output side does the mounted rotor assume its operating position in the motor stator. For kit servomotors the result is that when the electromotor is mounted the rotary encoder coupled to the motor stator and the rotor must, in equalizing fashion, bridge over a relatively large radial and axial movement between the rotor of the electromotor rotor and the stator. This necessarily large degree of equalization of the radial and axial movements works against the need for the greatest possible isogonality in the configuration when mounted.

If, in a manner known to the prior art, the rotor of the electromotor and the encoder shaft are joined by means of a bellows connection, problems arise that are difficult to solve, particularly because, in the case of angular acceleration, the inertia of the rotating parts of the rotary encoder that are connected to the encoder shaft results in a torque which may cause resonance vibrations in the entire system. This is particularly a source of problems when a high normal rigidity is required in the servomotor system.

The known stator connection avoids this problem, since only the bearing friction of the rotating parts, which is minimal, exerts a torque on the stator connection. Thus practically no torque that is dependent on the rotational acceleration is exerted on the stator connection. However, in a configuration with a stator connection it can be difficult to minimize the mass of the rotary encoder system, and this can be problematic particularly when there are large diameters. The greater the mass of the rotary encoder system, the more rigid is the chosen stator connection, which in turn increases the forces at work on the bearings of the rotating parts of the rotary encoder, and this is disadvantageous for the operating life of the configuration.

DESCRIPTION OF THE DRAWING

FIG. 1 is a cross-section view of an exemplary embodiment of the present subject matter.

DESCRIPTION OF THE INVENTION

The invention is based on the problem of creating a kit servomotor which couples the rotary encoder to the electromotor in a cost-effective manner and which, in particular, is well-suited to the special demands placed on such kit servomotors.

The invention solves this problem with a kit servomotor.

Other advantageous embodiments of the invention are also described below.

Generally speaking, the kit servomotor according to the invention involves a motor with a large diameter, which is also known as a torque motor. These kit motors with a large diameter are generally not designed for high rotational accelerations like standard servomotors, whose performance is based on rotary speed and which therefore always operate with a gear. The invention utilizes the relatively low rotary acceleration which is a feature of such kit motors to provide a cost-effective design for the rotary encoder coupling. The design of the rotor as a hollow shaft, which is customary in these kit electromotors with a large diameter, is used to coaxially position the encoder shaft, with its smaller diameter, in the inner diameter of the hollow shaft of the rotor and to construct the coupling as an axially flat coupling which bridges the annular gap between the outer diameter of the encoder shaft and the inner diameter of the hollow shaft. The coupling of encoder shaft and rotor thus barely enlarges the axial length of the kit servomotor, and this is advantageous. The flat coupling basically has the shape of an elastic annular disk, so that it can absorb the high axial and radial movements, but at the same time has a high rotational rigidity and thus retains its isogonality. The coupling will preferably be formed by an elastic membrane, and particularly a rubber-elastic material. In order to absorb the high axial and radial movements, which may particularly arise between the unmounted and mounted condition of the kit servomotor, the membrane will preferably be corrugated in concentric fashion.

As an alternative, it is also possible to produce the coupling from a springy elastic sheet metal, such that the coupling will ideally have elastic elements that are made of this sheet metal and are formed, e.g., by radial spring strips. These spring elements, specifically spring strips, are stamped out of sheet metal in such a way that the sheet metal plane occupied by the spring elements runs basically perpendicular to the axis of the rotor or, as the case may be, of the encoder shaft. Thus the connection formed by the spring elements has elastic flexibility in the radial and particularly the axial direction, while providing a high rotational rigidity in the plane occupied by the spring elements.

In order to mount the coupling in a precise and simple manner it is advantageous if the coupling is secured to the hollow shaft with a circumferential element and to the encoder shaft with a hub element. It is thus possible, in a simple manner, to secure the coupling to one terminal face of the hollow shaft and to the motor end of the encoder shaft, e.g., by screwing, riveting, or welding.

The invention will next be described in greater detail on the basis of an exemplary embodiment, which is shown in the drawing. The single FIG. 1 provides an axial section through a kit servomotor.

The kit servomotor shown in the FIGURE consists of a kit electromotor and a rotary encoder (a device for measuring angular rotation) installed upon it. The kit electromotor has a rotor 1, which supports permanent magnets 2. The kit electromotor also has a motor stator with coils 3, which are positioned in a motor housing 8.

As is characteristic for a kit motor, the rotor 1 with the permanent magnets is not mounted in the motor housing 8 in its unassembled delivery condition. Instead, the rotor 1 initially lies unsupported in the motor housing 8 and rests, along with the permanent magnets 2, on the pole shoes of the coils 3. The rotor 1 thus rests in eccentric fashion within the motor housing 8.

In mounting the kit electromotor, the motor housing 8, with the installation flange 9, is mounted onto the application device, and the rotor 1 is connected to that part of the application device which is to be driven, e.g., is mounted as a hollow shaft on the shaft that is to be driven. In this way the rotor 1 is brought into its centered, coaxial position in the motor housing 8.

The rotary encoder has a stator unit 4, in which an encoder shaft 5 is mounted in coaxially rotating fashion. In manner known to the prior art, the encoder shaft 5 supports a rotating material measure, which is scanned by a scanning device positioned in the stator unit. Since the rotary encoder is constructed in a known manner, it is only schematically depicted in the drawing. The stator unit 4 with the encoder housing is firmly positioned on an inner flange 10, e.g., is screwed on, and the inner flange 10 is positioned in the motor housing 8, on that face of the electromotor that lies opposite the installation flange 9. In this manner the stator unit 4 of the rotary encoder is rigidly connected to the motor housing 8 and thus to the motor stator formed by the coils 3.

The end of the encoder shaft 5 engages coaxially with the hollow shaft of the rotor 1, and the outer diameter of said end of the encoder shaft 5 is smaller than the inner diameter of that half of the shaft. The encoder shaft 5 is connected to the rotor 1 isogonally, but is elastic in radial and axial directions. This is achieved by an axially flat coupling, which essentially has the shape of a circular disk. The coupling consists of a circular, disk-shaped diaphragm 6, which is made of a rubber-elastic material. At its center the diaphragm 6 is provided with a round hub element 7 and on its circumference with a circular, disk-shaped circumferential element 11. The hub element 7 has an axially centric, conical reception area, which matches one conical end of the encoder shaft 5 and engages with it. The hub element 7 is connected in permanent fashion to the inserted encoder shaft 5, e.g., by means of screwing. The circumferential element 11 rests on that terminal face of the hollow shaft of the rotor 1 that looks toward the rotary encoder, and is permanently connected to it, e.g., by means of screwing.

The diaphragm 6 is corrugated in concentric fashion, i.e., when viewed in a radial section it has the shape of a wave, such that the wave troughs and peaks surround the central axis of the rotor 1 and the encoder shaft 5 in concentric fashion. Due to the elasticity of the diaphragm 5 and its corrugated shape, the encoder shaft 5, along with the hub element 7, can move axially and radially in relation to the hollow shaft of the rotor 1, with the result that a radial and/or axial displacement between the encoder shaft 5 and the rotor 1, is equalized, as is the angle of alignment between the encoder shaft 5 and the rotor 1. However, the diaphragm 6 has a sufficiently high degree of rigidity in the direction of rotation to transmit the rotational movement of the rotor 1 to the encoder shaft 5 in isogonal fashion.

The diaphragm 6 and the hub element 7 are shifted in the axial direction, relative to the circumferential element 11, with the result that that said diaphragm 6 and the hub element 7 are located inside the hollow shaft of the rotor 1. The encoder shaft 5 projects coaxially into the hollow shaft of the rotor 1. The radial gap between the outer diameter of the encoder shaft 5 and the inner circumference of the hollow shaft of the rotor 1 is bridged by the coupling, specifically by the diaphragm 6. In this way, the coupling is almost completely shifted into the interior of the hollow shaft of the rotor 1 and barely increases the axial length of the kit servomotor. The rubber-elastic material of the diaphragm 6 also has damping properties, so that any minimal deformations in the rotational direction do not lead to resonance phenomena in the control circuit.

LIST OF REFERENCE NUMERALS 1 rotor
2 permanent magnets
3 coils
4 stator unit
5 encoder shaft
6 diaphragm
7 hub element
8 motor housing
9 installation flange
10 inner flange
11 circumferential element

The invention claimed is:

1. A kit servomotor, consisting of an electromotor and a rotary encoder, where the electromotor has a motor stator (3, 8) and a rotor (1), which is positioned in unsupported fashion in the motor stator; where the motor stator (3, 8) and the rotor (1) can be installed on the output end; where the rotor (1) is designed as a hollow shaft, at least on its end (9) opposite the end used for installation; where the rotary encoder is attached to the electromotor at the end opposite the installation end (9) and has a stator unit (4) and an encoder shaft (5); where the stator unit (4) is firmly connected to the motor stator (3, 8); and where the encoder shaft (5) is connected to the rotor (1) using a coupling that is isogonal with respect to the angle of rotation, but elastic in the radial and axial directions,
wherein
the encoder shaft (5), at its motor end, which is coaxial to the hollow shaft of the rotor (1), has an outer diameter that is smaller than the inner diameter of the hollow shaft, and the coupling is axially flat in design and bridges the annular gap between the outer diameter of the encoder shaft (5) and the inner diameter of the hollow shaft.

2. Kit servomotor according to claim 1,
wherein
the coupling has a circumferential element (11) to secure it to the hollow shaft of the rotor (1) and a hub element (7) to secure it to the encoder shaft (5).

3. Kit servomotor according to claim 2,
wherein
the circumferential element (11) is a circular disk, which can be secured to the terminal face of the hollow shaft.

4. Kit servomotor according to claim 2,
wherein
the hub element (7) is secured to the motor end of the encoder shaft (5).

5. Kit servomotor according to claim 4, wherein
the hub element (7) and the end of the encoder shaft (5) interlock using axially centric conical surfaces.
6. Kit servomotor according to claim 1, wherein
the coupling has an elastic diaphragm (6).
7. Kit servomotor according to claim 6, wherein
the diaphragm (6) consists of a rubber-elastic material.
8. Kit servomotor according to claim 6, wherein
the diaphragm (6) is corrugated in concentric fashion.
9. Kit servomotor according to claim 1, wherein
the coupling has spring elements made of springy elastic sheet metal.
10. Kit servomotor according to claim 1, wherein
the spring elements have radial spring strips.

* * * * *